United States Patent Office 3,098,104
Patented July 16, 1963

3,098,104
ALKYLPHENYL BIS THIOETHERS
Walter Reifschneider, Midland, Mich., assignor to The Dow Chemical Company, Midland, Mich., a corporation of Delaware
No Drawing. Filed June 27, 1962, Ser. No. 205,504
5 Claims. (Cl. 260—609)

The present invention is directed to thioethers and in particular is directed to novel thioethers corresponding to the formula

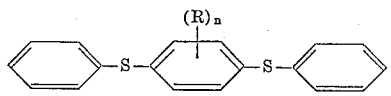

In the present specification and claims, R represents a lower alkyl group being of from 1 to 6, inclusive, carbon atoms and $n$ is an integer from 1 to 6, inclusive.

The novel compounds are usually colorless or light-colored crystalline solids appearing white or near white in mass, very slightly soluble in water but moderately soluble in lower alkanols and readily soluble in various common organic solvents such as acetone, benzene, xylene, and the like. The compounds are useful as insecticides, miticides and nematocides; they are selectively herbicidal; as inhibitors of the germination of fungus spores, they are effective fungistats. Also they are rodenticides.

The compounds are prepared by a process which comprises the steps of causing a reaction between an aromatic halide compound corresponding to the formula

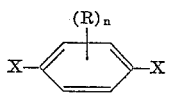

wherein X represents halogen, and a benzenethiol compound that is the benzenethiol itself, or an alkali metal or cuprous salt of benzenethiol.

During the reaction to prepare the present compounds, 2 molecules of benzenethiol compound react with each molecule of aromatic halide. Small amounts of benzenethiol may be lost in side reaction. Thus, when it is desired to prepare the present compounds in a high state of purity and with a minimum of necessary post-synthesis purification procedure, the starting benzenethiol should be employed in an amount twice equimolecular with the aromatic halide, or preferably, with the benzenethiol in slight excess. However, other proportions may be employed if desired, and unconsumed starting material of whatever identity may, if desired, be recycled into further synthesis process.

The reaction goes forward at temperatures over a wide range, such as from 30° to 350° C., but initiates most readily when heated to a temperature somewhat higher than room temperature; a preferred temperature range is from 100° to 230° C. Under these conditions the reaction is, in general, exothermic and goes forward to completion with good yield calculated upon the basis of consumed starting material. When employing benzenethiol, hydrogen halide of reaction is evolved and means for its orderly disposal are advantageously provided.

Typically, in the preparation of the compounds of the present invention, reaction between the benzenethiol starting material and the aromatic halide starting material will initiate and go forward only when there is employed a catalytic amount of both a source of cuprous ion and a nitrogenous base. Thus, in the preparation of several and probably all of the present compounds, the employment of such catalyst is essential and critical, although the exact weight is not critical. Certainly the employment of such catalyst is in all cases highly advantageous. The source of cuprous ion can be metallic copper, in which case the copper reacts in some way to obtain cuprous halide. Also, cuprous oxide may be employed as a source of cuprous ion in which case water of reaction is evolved and a cuprous halide results. A cuprous benzenethiol reactant is effective. Cuprous chloride itself or other cuprous salt may be employed. The employed amount is not critical, but may vary from a very small trace amount, less than $\frac{1}{100}$ of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as a hydrocarbon oil.

It is preferred, in at least laboratory amounts, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the present invention, the aromatic halide and the mercaptan are intimately mixed and blended, in any order and in desired amounts, with source of cuprous ion and nitrogenous base as hereinbefore described, preferably in liquid reaction medium which may be inert reaction medium or preferably nitrogenous base catalytic reaction medium and thereafter heated, to a temperature at which reaction takes place promptly. Some amount of product is prepared at once. When it is desired to obtain the product in good yield, higher temperatures and longer reaction times are indicated. In one convenient method of practicing the present method, the reaction temperature may be the reflux temperature of the liquid reaction medium. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include xylene, acetone, and benzene. From the said precipitate, product is extracted with solvent, the solvent extract dried over an inert drying agent such as, for example, anhydrous potassium carbonate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—2,5-Bis(Phenylthio)-p-Xylene*

A reaction mixture is prepared, consisting of 26.3 grams (0.1 mole) of 2,5-dibromo-p-xylene, 16 grams of cuprous oxide (technical grade) and 22 grams (approximately 0.2 mole) of benzenethiol dispersed in a mixture consisting of 110 milliliters quinoline and 10 milliliters pyridine. The resulting reaction mixture is placed in a flask under reflux, the reflux being equipped with a water trap. In this situation, the reaction mixture is heated at its reflux temperature (a pot temperature between approximately 200° and 240° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with xylene, the xylene extract liquid being saved. This liquid is dried over a bed of anhydrous potassium carbonate which also neutralizes remaining traces of acidic substances; the resulting liquid is warmed to vaporize and remove xylene solvent and obtain a residual oil. This oil crystallizes upon standing; the crystals are taken up in hot ethanol and precipitated therefrom as the ethanol cools, to obtain a 2,5-bis(phenylthio)-p-xylene product as pale tan crystals melting at 75.2°–73° C.

The compound of the present example is useful as an insecticide, and for the control of domestic rodent pests. The ingestion of 200 milligrams of the said compound as sole toxicant by each member of a population sample of white mice resulted in 100 percent kill of the mice of said sample. Also, the inclusion of the compound of the present example as sole toxicant in the amount of 10 parts by weight per million parts of resulting aqueous culture medium gave commercially satisfactory kill of a heavy population of young root-knot nematodes maintained for 6 days therein, whereas in a check group maintained in otherwise identical culture from which the present toxicant was absent, natural mortality was statistically insignificant.

*Example II.—2-Ethyl-3,6-Bis(Phenylthio)Toluene*

In procedures essentially similar to the foregoing except that the starting aromatic halide employed in an amount approximately half equimolecular with the benzenethiol is 3,6-dichloro - 2 - ethyltoluene, there is prepared, in good yield, 2-ethyl-3,6-bis(phenylthio)toluene and benzene and of extremely low solubility in water. The compound has a molecular weight of 335.5.

*Example III.—1,4-Di(3,3-Dimethylpropyl) - 2,5 - Bis- (Phenylthio)Benzene*

A reaction mixture is prepared consisting of 31.4 grams (0.1 mole) of 2,5-dichloro-1,4-di(3,3-dimethylpropyl)-benzene, 7.2 grams technical cuprous oxide, 22 grams (approximately 0.2 mole) benzenethiol dispersed together in 130 milliliters technical 2,4-lutidine and 60 milliliters quinoline, as mixed liquid reaction medium. The resulting reaction mixture is heated, with stirring, at its boiling temperature and under reflux overnight (approximately 15 hours), the reflux condenser being equipped with a water separator. At the conclusion of the reaction time, the resulting hot mixture is poured directly into a mixture of chipped ice and 200 milliliters concentrated hydrochloric acid. As a result of these procedures, the ice melts and a brown solid separates in the resulting aqueous dispersion. This solid is collected by filtration and a xylene extract made of it. The xylene extract is washed twice with 10 percent hydrochloric acid and then dried over potassium carbonate. From the resulting dry xylene solution, xylene solvent is evaporated, leaving a white solid which is recrystallized from methanol to obtain crystals of 1,4-di(3,3-dimethylpropyl) - 2,5 - bis(phenylthio)benzene having a molecular weight of 463.8.

In procedures essentially the same as the foregoing, by the use of appropriate starting materials, other products of the present invention are prepared as follows:

From X,X'-dichlorotoluene and an excess above 2 molecular proportions of benzenethiol, in the presence of cuprous oxide and in liquid lutidine-quinoline mixture, an X,X'-bis(phenylthio)toluene.

From 2,5-dibromo-1,4-di-tertiarybutylbenzene and 2 molecular proportions of benzenethiol in the presence of cuprous lactate and in a propanol solution of secondary n-butylamine, 2,5-bis(phenylthio)-1,4-di-tertiarybutylbenzene.

Benzenethiol is an article of commerce. The aromatic halides necessary as starting materials in the practice of the present invention are, for the most part, articles of commerce. However, those which are not can readily be prepared in known procedures such as, for example, those set forth in "Synthetic Organic Chemistry" (John Wiley & Sons, Inc., New York, 1953), by Wagner and Zook, chapter 4, note especially the references in the table, pages 124 and 125. Other methods are well known to those skilled in the art.

I claim:
1. Compound of the formula

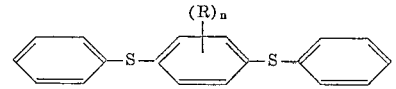

wherein R represents a lower alkyl group being of from 1 to 6, inclusive, carbon atoms and $n$ is an integer from 1 to 2, inclusive.
2. 2,5-bis(phenylthio)-p-xylene.
3. 2-ethyl-3,6-bis(phenylthio)toluene.
4. 1,4 - di(3,3 - dimethylpropyl) - 2,5 - bis(phenylthio)benzene.
5. 2,5-bis(phenylthio)-1,4-di-tertiarybutylbenzene.

No references cited.